UNITED STATES PATENT OFFICE.

FELIPPE SABOIA BANDEIRA DE MELLO, OF RIO DE JANEIRO, BRAZIL.

ELECTRIC BATTERY.

14,051. Specification of Reissued Letters Patent. Reissued Jan. 25, 1916.

No Drawing. Original No. 1,148,152, dated July 27, 1915, Serial No. 796,949. Application for reissue filed November 20, 1915. Serial No. 62,628.

*To all whom it may concern:*

Be it known that I, FELIPPE SABOIA BANDEIRA DE MELLO, of 76 Rua S. José, Rio de Janeiro, Brazil, have invented certain new and useful Improvements in or Relating to Electric Batteries, of which the following is a specification.

This invention relates to electric batteries and applies both to primary and to secondary batteries.

The leading feature of the invention consists in the employment, as a depolarizer, of a copper compound obtained by submitting protosulfid of copper ($Cu_2S$) to the action of electric current in a solution of alkaline hydrate so that it is reduced by the hydrogen liberated and exposing the resulting product to the air. As is known, protosulfid of copper can be obtained by the combustion of copper in sulfur vapor away from contact with the air.

In carrying out the invention in practice, I proceed as follows to form a depolarizing element:—The protosulfid of copper having been obtained in the manner above indicated, I break it into small pieces which I place in a cylinder of wire cloth (say copper) disposed around a metallic rod (say copper) which forms the axis of the depolarizer. The cylindrical element thus obtained will form a voltaic couple with zinc, having a concentrated solution of caustic soda as an electrolyte, and such a couple serves for converting the copper protosulfid to a porous mass containing copper, which is the substance employed in the preparation of the depolarizer. The said couple has an E. M. F. of 0.7 volt, and I allow it to work for several days until complete reduction of the copper protosulfid to a porous mass formed of copper contained in the enveloping wire cloth cylinder. The cylindrical element is withdrawn from caustic soda and immersed or washed in ordinary water, which frees it from zincate of sodium. On then exposing the element to the air at ordinary temperature, the porous mass oxidizes, and the depolarizing element or electrode is then ready for use as an element in a primary or secondary battery with any suitable electrolyte, for example, caustic soda and any suitable element to form the other member of the couple, for example zinc.

The new depolarizer has the property of reconstituting or regenerating itself easily so that it can work many times or almost indefinitely. For this reconstitution it suffices to immerse the exhausted depolarizer in plain water and to allow it to dry afterward in the air. It is thus reoxidized and can be used again in the same way.

The electrode made in accordance with the invention presents a highly porous structure which is extremely easy to oxidize; analysis of such oxidized electrode shows it to be constituted of copper oxid.

It will be understood that the copper mass is brought into its finely divided highly porous condition under the reducing action of the hydrogen, which attacks or combines with the other elements of the chemical compound or salt, leaving a porous mass of copper which is finely divided by the chemical action and can then be oxidized at ordinary temperature by exposure to the air, and I believe that the ease with which the mass of copper is oxidized by exposure to the air at ordinary temperature is due to the fact that the copper is possibly present throughout the mass in the form of free molecules as a result of reducing the compound by hydrogen. In order to define the mass made in accordance with the improved process hereinbefore referred to, I refer to same as a finely divided highly porous mass of copper in molecular condition. The electrolytic action hereinbefore described liberates the hydrogen, which acts on the copper compound, the reducing action being due to the hydrogen rather than to any peculiar manner in which the hydrogen may be produced.

What I claim as my invention and desire to secure by Letters Patent, is:—

1. The method of manufacturing electrodes of the kind described for battery cells, consisting in taking a copper compound reducible by hydrogen, then reducing said compound by hydrogen and oxidizing the reduced copper by exposure to the air at ordinary temperature.

2. The method of manufacturing electrodes of the kind described for battery cells, consisting in reducing an insoluble copper compound which is reducible by hydrogen by the action of electrolysis to a highly porous mass of metallic copper and oxidizing said mass by exposure to the air at ordinary temperature.

3. The process of manufacturing electrodes of the kind described for primary or secondary battery cells, consisting in reducing copper sulfid by electrolysis, and oxidizing the resulting mass.

4. The process of manufacturing electrodes of the kind described for primary or secondary battery cells, consisting in reducing copper sulfid by electrolysis in an alkaline solution, and oxidizing the resulting mass by exposure to the air.

5. The process of manufacturing electrodes of the kind described for primary or secondary cells, consisting in introducing copper sulfid into a support, reducing said copper sulfid by electrolysis in an alkaline solution to the state of a porous mass, and oxidizing said mass by exposing same to the air.

6. The process of manufacturing electrodes of the kind described for primary or secondary cells, consisting in introducing copper sulfid into a receptacle of metallic netting, reducing said copper sulfid by electrolysis in a solution of caustic soda to the state of a porous mass, and oxidizing said mass by exposure to the air at ordinary temperature.

7. The method of manufacturing electrodes of the kind described for battery cells, consisting in taking a copper salt which is reducible by hydrogen, reducing said copper salt by hydrogen, and oxidizing the reduced copper by exposure to the air.

8. An electrode for battery cells of the kind described, comprising a receptacle containing a finely divided highly porous mass of copper in molecular condition.

9. An electrode for battery cells of the kind described, comprising a receptacle containing a finely divided highly porous mass of copper oxid in molecular condition, oxidized by exposure to the atmosphere at ordinary temperature.

In witness whereof, I have hereunto signed my name in the presence of subscribing witnesses.

FELIPPE SABOIA BANDEIRA DE MELLO.

Witnesses:
LAWRENCE LANGNER,
H. B. LANGNER.